US009049206B2

(12) United States Patent
Damola et al.

(10) Patent No.: US 9,049,206 B2
(45) Date of Patent: Jun. 2, 2015

(54) P2P FOR MOBILE PROVIDERS

(75) Inventors: Ayodele Damola, Solna (SE); Bob Melander, Sigtuna (SE); Jan-Erik Mångs, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 128 days.

(21) Appl. No.: 13/259,502

(22) PCT Filed: May 5, 2009

(86) PCT No.: PCT/SE2009/050484
§ 371 (c)(1),
(2), (4) Date: Sep. 23, 2011

(87) PCT Pub. No.: WO2010/128905
PCT Pub. Date: Nov. 11, 2010

(65) Prior Publication Data
US 2012/0016947 A1    Jan. 19, 2012

(51) Int. Cl.
*G06F 15/16*       (2006.01)
*H04L 29/08*       (2006.01)
*H04L 29/06*       (2006.01)

(52) U.S. Cl.
CPC .......... *H04L 67/104* (2013.01); *H04L 65/4076* (2013.01); *H04L 67/1074* (2013.01); *H04L 67/1089* (2013.01)

(58) Field of Classification Search
USPC ................................................. 709/204, 206
See application file for complete search history.

(56) References Cited

U.S. PATENT DOCUMENTS

| | | | |
|---|---|---|---|
| 6,748,525 B1 * | 6/2004 | Hubacher et al. | 713/1 |
| 7,593,333 B2 * | 9/2009 | Li et al. | 370/232 |
| 8,051,161 B2 * | 11/2011 | Hu et al. | 709/223 |
| 2003/0191933 A1 * | 10/2003 | Xu et al. | 713/153 |
| 2006/0168304 A1 * | 7/2006 | Bauer et al. | 709/232 |
| 2007/0094405 A1 * | 4/2007 | Zhang | 709/231 |
| 2007/0237139 A1 | 10/2007 | Garcia-Martin et al. | |
| 2008/0005114 A1 | 1/2008 | Li | |
| 2008/0123579 A1 | 5/2008 | Kozat et al. | |

(Continued)

FOREIGN PATENT DOCUMENTS

| | | |
|---|---|---|
| EP | 0 426 599 A2 | 5/1991 |
| JP | 2006-506877 A | 2/2006 |

(Continued)

OTHER PUBLICATIONS

International Search Report, PCT Application No. PCT/SE2009/050484, Jan. 28, 2010.

(Continued)

*Primary Examiner* — Vivek Srivastava
*Assistant Examiner* — Karina J Garcia-Ching
(74) *Attorney, Agent, or Firm* — Myers Bigel Sibley & Sajovec, P.A.

(57) ABSTRACT

The present invention relates to methods and arrangements for arranging a distribution tree in a Peer To Peer P2P streaming system. The system comprises a bootstrapping server (10) that creates an external distribution tree based on received register messages from participating operator external clients (2, 3, 4). The method comprises the following steps: —Configuring an operator controlled node (7) to be a regular node in the created external distribution tree. Configuring the operator controlled node (7) to be a parent node for participating operator internal clients (1, 5, 6).

26 Claims, 5 Drawing Sheets

(56) References Cited

U.S. PATENT DOCUMENTS

| | | | |
|---|---|---|---|
| 2008/0177833 A1* | 7/2008 | Gu et al. | 709/204 |
| 2009/0034434 A1 | 2/2009 | Tsang et al. | |
| 2010/0138555 A1* | 6/2010 | Gerber et al. | 709/232 |
| 2010/0235472 A1* | 9/2010 | Sood et al. | 709/219 |

FOREIGN PATENT DOCUMENTS

| | | |
|---|---|---|
| JP | 2008-527841 A | 7/2008 |
| JP | 2009-533925 A | 9/2009 |
| WO | WO 2004/047408 A1 | 6/2004 |
| WO | WO 2006/088402 A1 | 8/2006 |
| WO | WO 2008/066560 A1 | 6/2008 |
| WO | WO 2008/105170 A1 | 9/2008 |

OTHER PUBLICATIONS

Written Opinion of the International Searching Authority, PCT Application No. PCT/SE2009/050484, Jan. 28, 2010.

Japanese Office Action Corresponding to Japanese Patent Application No. 2012-509754; Mailing Date: Jul. 1, 2013; Foreign Text, 2 Pages.

Yong Liu et al. "A survey on peer-to-peer video streaming systems", *Peer-to-Peer Networking and Applications*, vol. 1 No. 1, Jan. 10, 2008, pp. 18-28.

Strauss et al. "Media telecom network: A Telco approach to peer-to-peer delivery of streaming content", *Bell Labs Technical Journal*, vol. 13, No. 3, Sep. 21, 2008, pp. 71-77.

European Search Report Corresponding to European Patent Application No. 09 84 4432; Dated: Aug. 19, 2014; 5 Pages.

* cited by examiner

Prior
Art

Fig. 1a

Prior
Art

P2P FOR MOBILE PROVIDERS

CROSS REFERENCE TO RELATED APPLICATION

This application is a 35 U.S.C. §371 national stage application of PCT International Application No. PCT/SE2009/050484, filed on 5 May 2009, the disclosure and content of which is incorporated by reference herein in its entirety. The above-referenced PCT International Application was published in the English language as International Publication No. WO 2010/128905 A1 on 11 Nov. 2010.

TECHNICAL FIELD

The present invention generally relates to systems and methods and, more particularly, to mechanisms and techniques for arranging a distribution tree in a Peer to Peer P2P streaming system.

BACKGROUND

P2P streaming applications are becoming commonplace on the PC and it foreseen that they will make their way into networked Consumer Electronic CE devices (e.g. MP3 players, media players etc). P2P streaming applications will also be available on mobile phone devices. Examples of P2P streaming applications are Joost (video) and Spotify (music).

P2P streaming applications work in much the same way as other P2P fileshare clients except that instead of downloading files, the users download streams. These streams are then exchanged in real-time with other users. Depending on implementation, no data might be stored locally on any machine connected to the network.

In these applications, an overlay construction mechanism organizes participating peers into multiple trees. Each peer determines a proper number of trees to join based on its access link bandwidth. To minimize the effect of churn and effectively utilize available resources in the system, participating peers are organized into multiple diverse trees. With diverse trees, each peer is placed as an internal node in only one tree and leaf node in other participating trees. When a peer joins the system, it contacts a bootstrapping server to identify a parent node in the desired number of trees. To keep the population of internal nodes balanced among different trees, a new node is added as an internal node to the tree that has the minimum number of internal nodes. An example of multiple diverse trees can be seen below:

Delivery tree-1

Delivery tree-2

P2P streaming applications are built on either tree-based or meshed based architectures. They differ in the way the peers relate to one another. Specifically in tree based systems the relationship between parent peers and child peers are static and a rigid tree structure is maintained during the system run time. In mesh-based there is no well defined relationship between parent and child peers, participating peers form a randomly connected overlay, or a mesh. In mesh-based systems each peer tries to maintain a certain number of parents (i.e., incoming degree) and also serves a specific number of child peers (i.e., outgoing degree). Upon arrival, a peer contacts a bootstrapping server to receive a set of peers that can potentially serve as parents. The bootstrapping server maintains the outgoing degree of all participating peers. Individual peers periodically report their newly available packets to their child peers and request specific packets from individual parent peers. A parent peer periodically receives an ordered list of requested packets from each child peer, and delivers the packets in the requested order. The requested packets from individual parents are determined by a packet scheduling algorithm at each child peer.

Figure 1A:
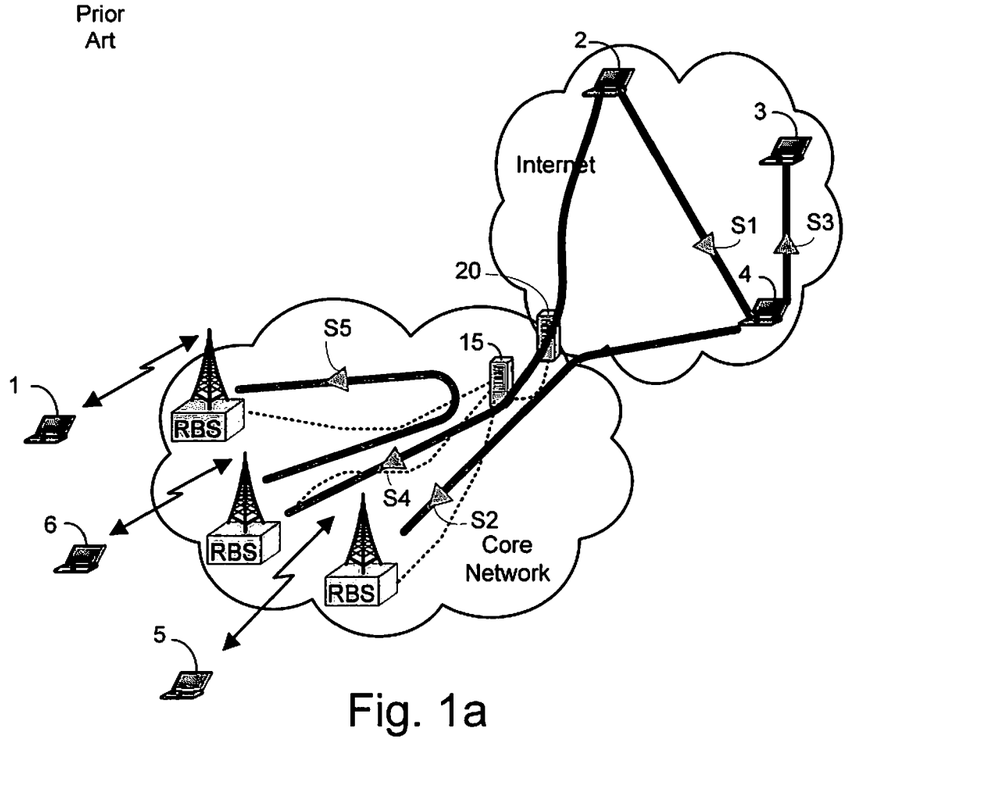
FIG. 1a is a schematic illustration according to prior art of a communication system comprising a plurality of clients connected to a core network via a mobile access network, and clients connected to an internet network. A packet data network gateway is the tunnel ingress/egress point for all internet traffic.
Figure 1B:
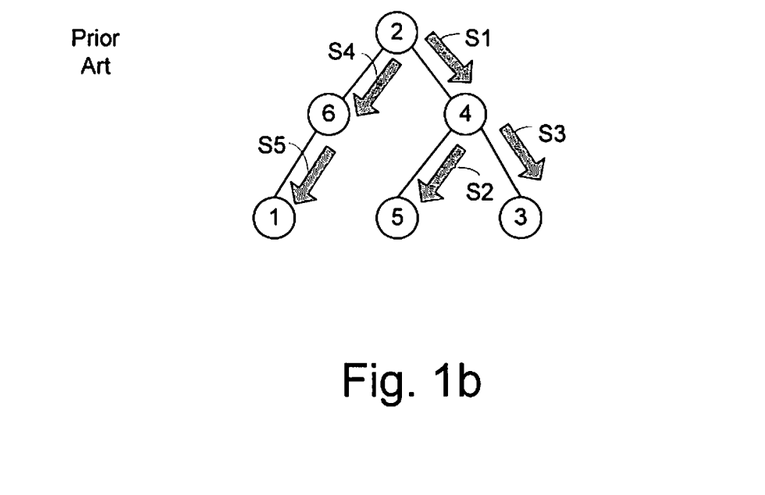
FIG. 1b discloses a tree structure according to prior art.

With time, when the business models have been worked out, P2P streaming applications will offer both audio and video. PCs (e.g. laptops) and some Consumer Electronic CE devices can today be connected to the cellular network e.g. via HSPA USB dongles. The behavior of end users has been shown not to change as they switch one access technology to another; hence traffic trends persist to a large extent as users switch from fixed to wireless accesses. It is then very logical to conclude that PCs, CEs and mobile devices will use the cellular network (3G/4G) to run P2P streaming applications in the near future. FIG. 1a shows segments of a 3GPP architecture impacted by P2P traffic. FIG. 1a discloses clients/laptops 2,3,4 within an internet network and clients/laptops 1,5,6 that communicate via Radio Base Stations RBSs within a radio access network that is part of a core network. The architecture of 3GPP mobile networks is built around tunneling. The tunnels are shown in FIG. 1a with dotted lines. In FIG. 1a a signaling gateway 15 acts as a tunnel terminating node and a packet Data Network GateWay 20 is the tunnel ingress/egress point for all internet traffic. All traffic from/to the radio based laptops 1,5,6 will go through 20. FIG. 1b discloses a tree structure according to prior art. In this simplified example content will be streamed S1, S2, S3, S4, S5 from the root of the tree i.e. node 2 in this example, downwards to all nodes in the tree. As can be seen in FIG. 1a traffic will negatively impact the radio access network and the core network. Due to the construction of the tree, content from node 6 to node 1 will be streamed S5 via the signaling gateway 15 and consequently causes extra load to the network. Furthermore, a requirement imposed by P2P systems on operators is that all nodes participating in the P2P system must contribute with their uplink capacity to the P2P network. This will also negatively impact the radio access network and the core network.

SUMMARY

An object of the invention is to overcome above identified limitations of the prior art. The invention focuses on the construction of a distribution tree of a P2P streaming systems so that negative impact on radio and core network will be reduced.

The basic concept of the invention is introduction of an operator controlled peer to act as parent peer for all operator internal clients.

The solution to the problems more in detail is a method for arranging a distribution tree in a Peer to Peer P2P streaming system. The system comprises a bootstrapping server that creates an external tree upon reception of register messages from participating operator external clients. The method further comprises the following steps:

An operator controlled node is configured to be a regular node in the created external distribution tree.
The operator controlled node is configured to be a parent node for participating operator internal clients.

According to one exemplary embodiment, a method and arrangement for arranging a distribution tree with a static tree structure is disclosed. Register messages from participating operator internal clients are captured by the operator controlled node, which messages are intended for the bootstrapping server. Replies that imitate the bootstrapping server are sent to the internal clients, which replies decide the operator controlled node as parent node for the internal clients. The tree is hereby arranged in a way that operator internal clients are concealed behind the operator controlled node so that dictated tree formation rules do not apply for the internal clients and their radio uplink capacity is hence spared.

According to another exemplary embodiment, an operator controlled node according to the invention is disclosed. The node is configurable to work in two modes: peer and parent mode. In the peer mode the node is able to join an external network where it appears as regular peer. For internal peers inside an operator's network, the node works in the parent mode.

According to yet another exemplary embodiment, streaming of content in a distribution tree arranged according to the invention has been disclosed.

An object of the invention is to reduce negative traffic impact on the radio access network and the core network. This object and others are achieved by methods, arrangements, nodes, systems and articles of manufacture.

Advantages of the invention are the reduced negative traffic impact on the radio access network and the core network (especially where the operator pays for transit traffic). Besides, the traffic over the radio access as well as the System Architecture Evolution SAE core network will be reduced as a result of eliminating the P2P uplink usage of internal peers. This is especially important as the radio access is a very scare resource. Also depending on the business model the operator benefits by the reducing of the amount of bits transported over the SAE core network. This is especially relevant in countries where the operator has a legal requirement to rent (rather than own) the SAE core transport from third party providers.

The invention will now be described more in detail with the aid of preferred embodiments in connection with the enclosed drawings.

DETAILED DESCRIPTION

Figure 2A:
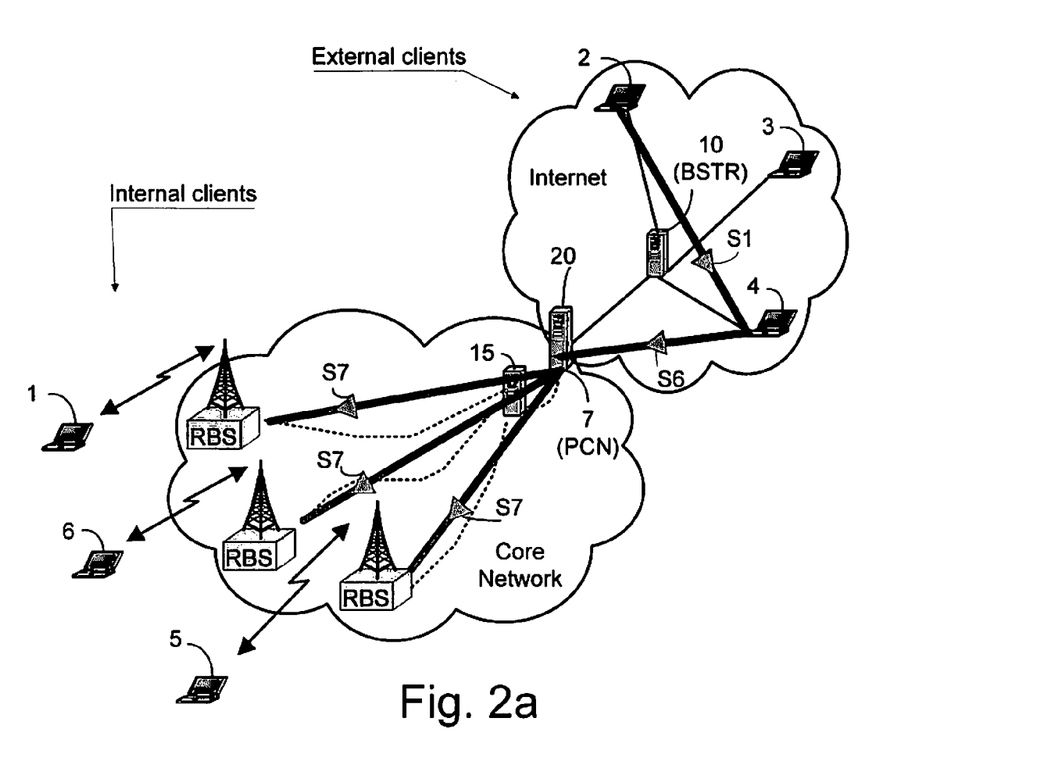
FIG. 2a is a schematic illustration of a communication system comprising a plurality of clients connected to a core network via a mobile access network and clients connected to an internet network. A packet data network gateway is the tunnel ingress/egress point for all internet traffic and an operator controlled node is arranged as part of the packet data network gateway.

FIG. 2a discloses an exemplary embodiment of the invention. The figure shows a peer to peer P2P network that includes plural peers/clients 1-6 (laptops in this example). The laptops 2,3,4 are connected via access networks (not shown in the figure) to an internet network, and laptops 1,5,6 are connected via a mobile access network to a Core Network. The figure discloses a very simplified example and the number of clients are in the reality much higher. The clients may be, for example, a mobile phone, a computer, a set top box, or other devices that are capable of exchanging information with the internet, i.e. even though connected via a mobile access, also the clients 1,5,6 can be either wireline or wireless clients. The access networks connecting the laptops 2,3,4 can be for example a communication network, a phone network, an internet service provider, etc.

The mobile network and the core network together constitutes a 3$^{rd}$ Generation Partnership Project (3GPP) mobile network. The architecture of 3GPP mobile networks is built around tunneling. In this network, the clients 1,5,6 each are given an IP address that does not change and is topologically anchored in a signaling gateway 15, regardless of where the client device actually is located in the IP domain. The signaling gateway 15 acts as a tunnel terminating node. The tunnels are shown in FIG. 2a with dotted lines. A packet Data Network GateWay 20 is the tunnel ingress/egress point for all internet traffic and all traffic from/to the radio based laptops 1,5,6 will go through the gateway 20. Downloaded streams S1, S6 and S7 can be seen in FIG. 2a. These streams will be further explained later in the description. A P2P control node PCN 7 is in this example part of the packet Data Network GateWay 20. The PCN is a vital part of the invention and will be further explained together with for example FIG. 4. A bootstrapping server BSTR 10 is located within the Internet. The bootstrapping server functions as a directory service for clients participating in the P2P network. The bootstrapping server is responsible for creating a distribution tree based on participating nodes.

Figure 2B:
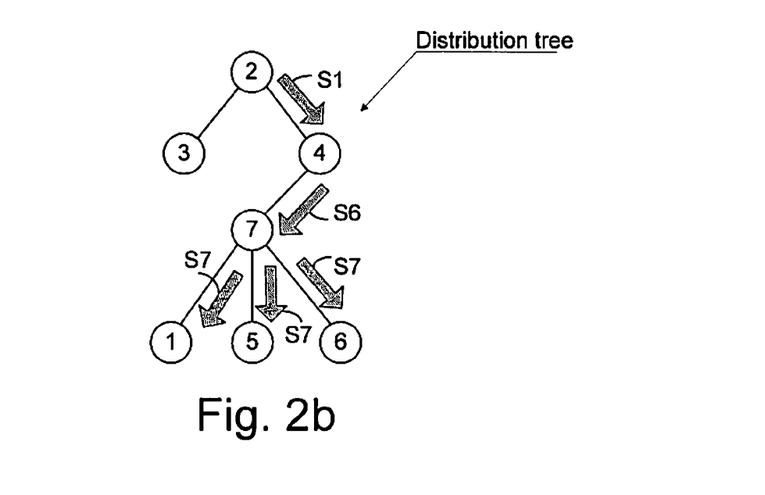
FIG. 2b discloses a tree structure according to the invention.

FIG. 2b discloses a distribution tree created according to the invention. The tree comprises nodes/peers 1-7. The streams S1, S6 and S7 that already have been mentioned in FIG. 2a can also be seen in FIG. 2b. According to prior art, in P2P streaming applications for peers to become part of the P2P network they have to send register messages to the bootstrapping server 10. The bootstrapping server would assign the new peers a parent peer from a list of already existing peers and in so doing will create a new branch of the P2P distribution tree. A reply is sent back to the new peers indicating the parent peer. Upon getting the reply, the new peers become part of a tree in the P2P network and may start sending content requests to the parent peer. An operator controlled peer PCN 7 is according to the invention implemented by including a set of new P2P-aware functionalities collectively called P2P control node 7 into a node where GTP tunnels are terminated. The terminating node is the PDN gateway 20 in this example. The significance of placing the PCN into the PDN GW 20 is that it is the ingress/egress point for all internet traffic; hence all the traffic from/to the mobile peers will go through it and this is important as the PCN node will be in the signaling path of the P2P traffic.

Figure 3:
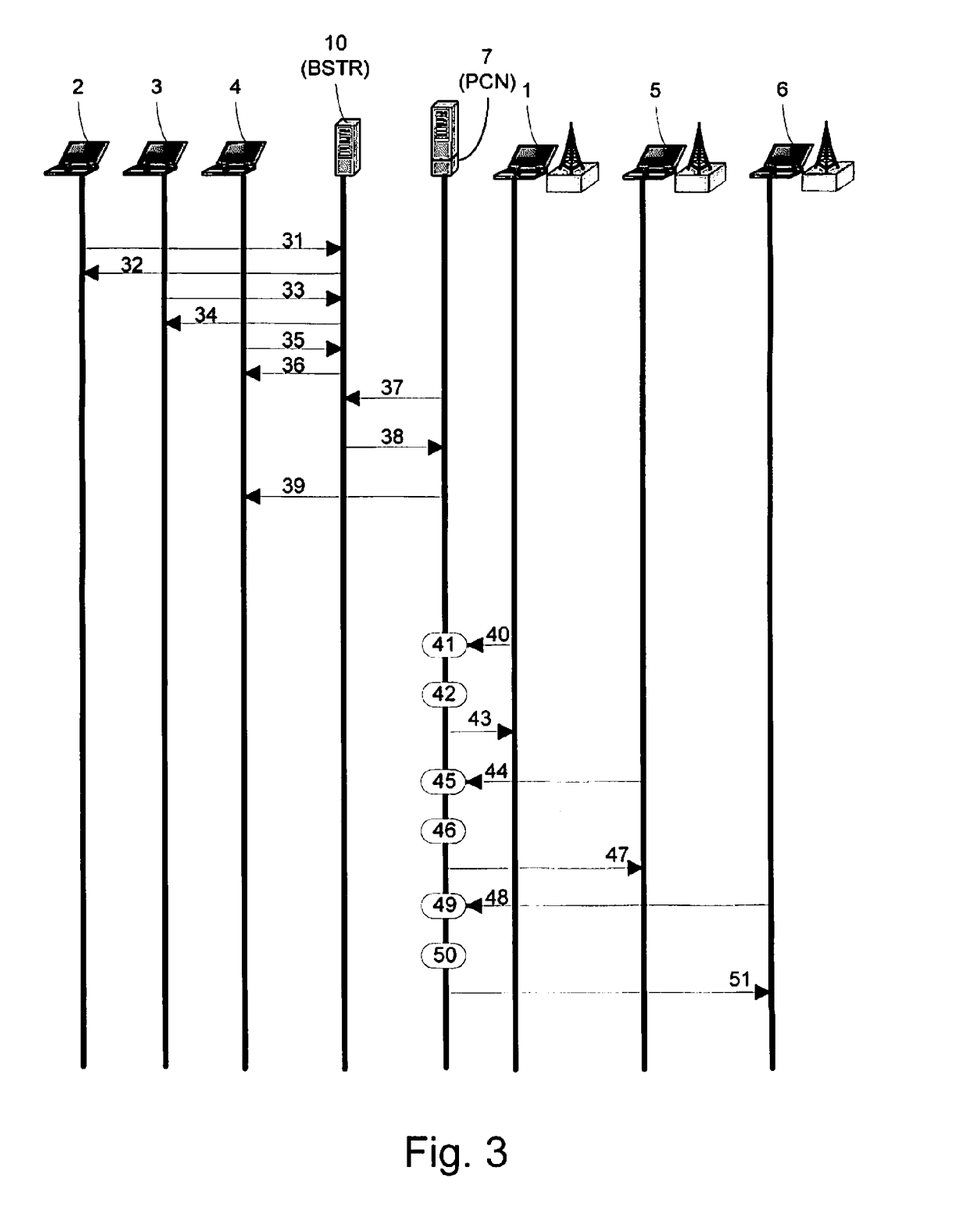
FIG. 3 discloses a signal sequence diagram representing a method for arranging a distribution tree in a Peer To Peer P2P streaming system.

The method according to the first embodiment will now be explained together with FIG. 3. FIG. 3 is a signal sequence diagram wherein the signalling points i.e. the laptops 1-6, the operator controlled node 7 and the bootstrapping server 10 that were explained earlier together with FIG. 2a have been disclosed. The method will show the arranging of a distribution tree according to the invention. The method comprises the following steps:

The method starts by creating a tree that comprises the nodes 2, 3 and 4. According to well known technique in P2P streaming applications, for clients to become part of the P2P network they have to send register messages to the bootstrapping server 10. The bootstrapping server would assign the new clients a parent peer from a list of already existing clients and in so doing will create a new branch of the P2P distribution tree. A reply is sent back to the new client indicating the parent peer. Upon getting the reply, the new peers become part of the tree. In FIG. 3 this has been performed by the clients 2, 3 and 4 by sending the register messages 31, 33 and 35 and receiving the replies 32, 34 and 36. The tree now comprises the nodes 2, 3 and 4 (see also FIG. 2b). So far the tree has been created according to prior art.

According to the invention, the operator controlled peer is implemented by including a set of new P2P-aware functionalities collectively called P2P control node PCN 7 as part of the PDN gateway 20. As will be seen, the P2P control node PCN 7 will logically separate the internal peers from the external peers in the Internet.

The operator controlled peer 7 sends a request 37 for a root node to the bootstrapping server 10.

The bootstrapping server 10 replies 38 with parent node information, this is usually a list of nodes which can serve as parent for the operator controlled peer 7. In this example the nodes 3 and 4 are suggested as parents (see FIG. 2b).

The operator controlled peer 7 selects node 4 to be parent node and registers 39 to node 4 as child node. From here on, the operator controlled node 7 and node 4 can exchange content chunks.

The mobile peer 1 sends a register message 40 addressed to the bootstrapping server 10, requesting to get the address of its parent server. This message serves to inform the bootstrapping server that a new peer is joining the P2P network.

The operator controlled node 7 captures 41 according to the invention the message 40 with the aid of Deep Packet Inspection DPI. The message 40 is suppressed 41 by the node 7 and is not propagated to the bootstrapping server.

A bootstrapping server reply message 43 is re-created 42 by the operator controlled node 7.

The message 43 is sent back from 7 to the mobile peer 1 as though from the boot strapping server with 7 as the parent peer i.e. the reply 43 is sent to the mobile peer 1 from 7 that imitates the bootstrapping server 10. The reply decides the operator controlled node 7 as parent node for the internal clients. So far the following nodes have been created in the distribution tree: 2, 3, 4, 7 and 1 (see FIG. 2b). Logically the PCN 7 is now the parent to the mobile peer 1 and for this reason it receives all the requests for content from the mobile peer. Being a parent peer, the PCN will also be the P2P node which acts as the source of content for the internal mobile peers. The significance of placing the PCN into the PDN GW is that it is the ingress/egress point for all internet traffic; hence all the traffic from/to the internal clients will go through it and this is important as the PCN node will be in the signalling path of the P2P traffic.

In the same way as described above, a message 44 from the mobile peer 5 is received and suppressed 45 by 7 and a reply message 47 is re-created 46 and sent back to the mobile peer 5. The following nodes have now been created in the distribution tree: 2, 3, 4, 7, 1 and 5.

In the same way as earlier described, a message 48 from the mobile peer 6 is received and suppressed 49 by 7 and a reply message 51 is re-created 50 and sent back to the mobile peer 6. The following nodes have now been created in the distribution tree: 2, 3, 4, 7, 1, 5 and 6.

When comparing the tree created according to prior art (FIG. 1b) with the tree created according to the invention (FIG. 2b) it can be seen that all the internal mobile peers now have been concealed behind the operator controlled node. The significance of this is that the operator can remove the requirement imposed by P2P systems that all peers must contribute with their uplink capacity to the P2P network. Hence with the PCN in place the mobile peers are concealed behind the PCN and will be able to get content from the P2P network without contributing in return. The PCN will do all the contribution on behalf of the mobile peers, this way satisfying the requirement of the P2P network and at the same time reducing bandwidth utilization inside the mobile network.

The described concept also applies to pre-SAE architecture in which case the PCN could be hosted by the GGSN.

The above described example covers mesh based or pull-based P2P. There is another type of P2P streaming and that is the 'tree-based' or push based P2P. Here the peers do not ask the parent node for a chunk, they only get what the parent gives them. In a mesh based system there are two main types of requests from a peer; bootstrapping request and chunk request, the chunk request will be further clarified together with FIG. 5 in this application. In a tree-based or push-based, here after getting a parent the child peers only receives whatever the parent node gives it (very much like the way multicast works). The peer only makes a bootstrapping request. There is yet a third approach called hybrid, here depending on the specific implementation the idea is to combine features of mesh and tree based approaches. The invention covers all three approaches. This will be obvious to someone skilled in the art.

Figure 4:
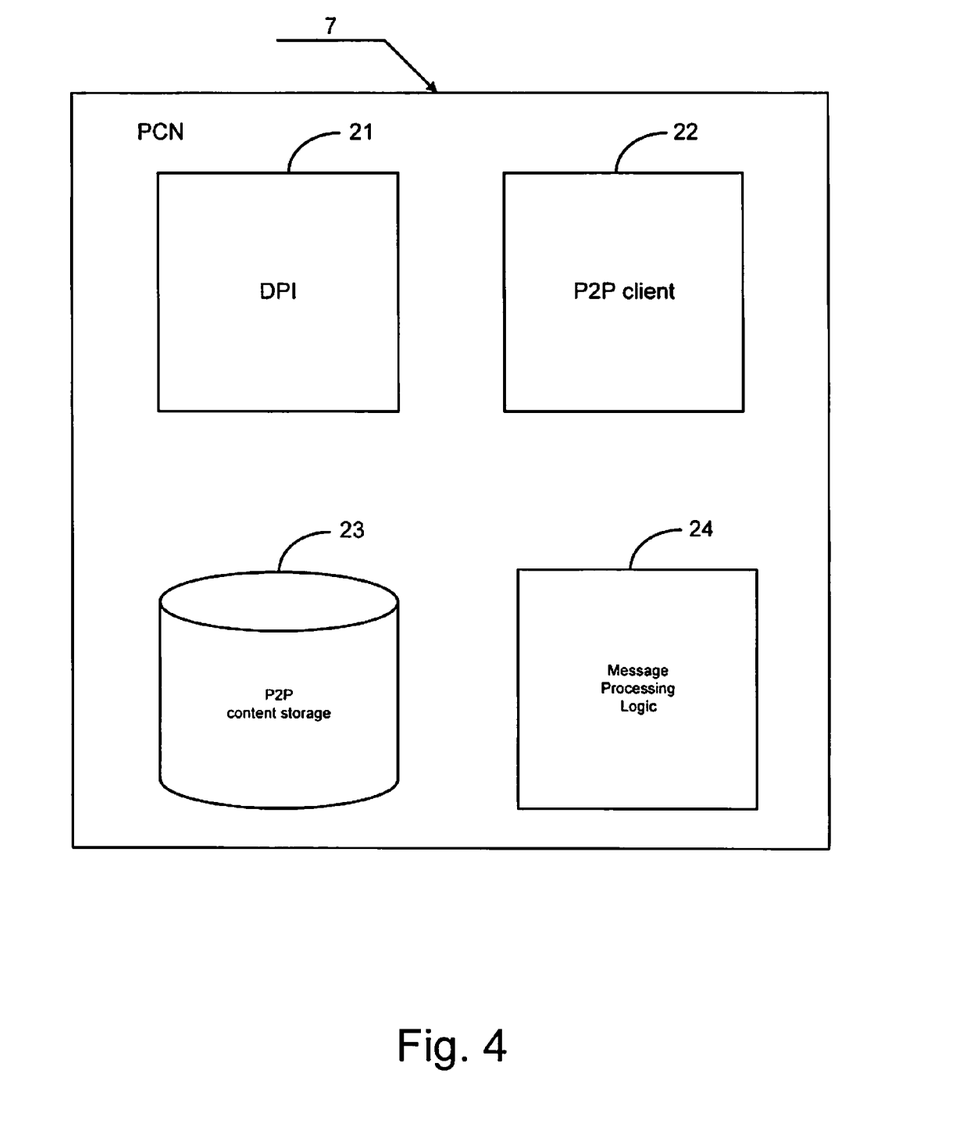
FIG. 4 discloses a block schematic illustration of an operator controlled node.
Figure 5:
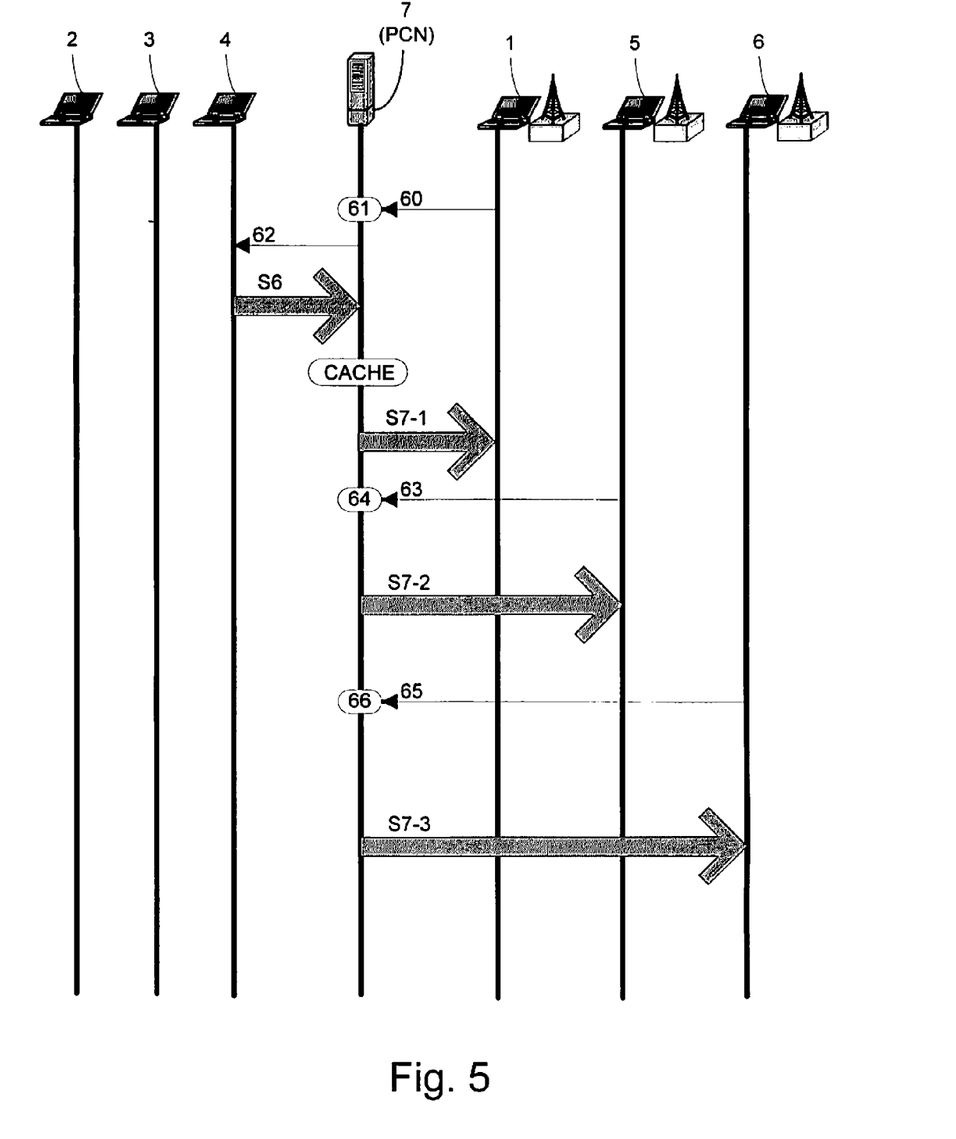
FIG. 5 discloses a signal sequence diagram representing streaming of content in a tree structure created according to the invention.

FIG. 4 discloses the structure of the operator controlled PCN node 7. The PCN is a collection of functions which enable the operator to control the traffic of P2P streaming applications by influencing how the P2P distribution tree is built. The main component is the Deep Packet Inspection DPI module 21 which enables to identify P2P control messages sent by the mobile peers. Deep Packet Inspection is a form of computer network packet filtering that examines the data and/or header part of a packet as it passes an inspection point to decide if the packet can pass or if it needs to be routed to a different destination. When a new mobile peer sends a message to the bootstrapping server requesting to get the address of its parent server, the PCN functionality 21 captures the message with the aid of DPI. The mobile peer's message is not propagated to the bootstrapping server. Instead a bootstrapping server reply message is re-created by the Message Processing Logic 24 in the PCN. The Message Processing Logic 24 is also responsible for modifying received requests to simulate that the PCN is requesting content chunk. This will be further discussed together with FIG. 5. The P2P client 22 in the PCN functions in two modes; peer and parent mode. In the peer mode the PCN is able to join external P2P network where it appears as a regular peer. For the internal mobile peers inside the operator's network, the PCN works in the parent mode. The P2P client 22 also selects a node of suggested nodes as parent node, as described in the first embodiment. The P2P Content Storage 23 is responsible for cashing streamed content that passes the PCN, this will be further clarified when FIG. 5 is explained. Furthermore, the PCN comprises means for sending re-created replies to peers that imitates the bootstrapping server, and means for sending requests (e.g. for a parent node or for content chunk) and means for sending content chunk, and means for receiving replies (e.g. node suggestions or requests for content chunk) and means for receiving content chunk. The above mentioned send and receive means are not shown in FIG. 4 in an attempt to make the figure more clear and understandable.

FIG. 5 is a signal sequence diagram wherein the signalling points i.e. the clients/laptops 1-6 and the operator controlled node 7 that were explained earlier together with FIG. 2a have been disclosed. A pre-requisite for the method below is that the distribution tree shown in FIG. 2b has been arranged. The method is to be seen as a continuation of the method shown in FIG. 3. The method will show the requesting for content by the clients 1,5,6, and streaming of the requested content. The well known principle behind streaming is that a parent peer gets requests for content chunk from child peers and supply the child peers with the chunk if it is in their possession. If it is not, a request is made further to the parent peers of the parent node and so on till a peer supplies the chunk.

The streaming method according to the invention comprises the following steps:

The internal peer 1 sends a request 60 to its parent for content chunk. Since the distribution tree has been created according to the invention, the parent for peer 1 is the operator controlled node PCN 7.

With the aid of Deep Packet Inspection DPI 21 (see FIG. 4), the message is identified 61 as a message sent by an internal peer.

The operator controlled node is not in possession of the requested chunk and the chunk must therefore be further requested from the parent's 7 parent i.e. node 4 in this case. The received request 60 is modified 61 according to the invention in the Message Processing logic 24 (see FIG. 4) in the operator controlled node 7 to simulate that the operator controlled node is requesting the content chunk from 4. This is because for the external peers 2,3,4 the internal peers 1,5,6 do not exist as only the operator controlled node 7 is part of the external tree.

The modified request simulating that the operator controlled node 7 is requesting the content chunk is sent 62 from the operator controlled node to the external peer 4.

The external peer 4 is in possession of the content chunk and streaming S6 takes place from peer 4 to the operator controlled node 7.

The streamed content is cached CACHE in the P2P content storage 23 (see FIG. 4).

Streaming S7-1 of the content now takes place from the operator controlled node 7 to the internal peer 1.

FIG. 5 further discloses how the internal peers 5, 6 request 63, 65 the same content chunk as was requested by 1. The content chunk is fetched 64, 66 from the P2P content storage 23 and streamed S7-2 and 57-3 from the operator controlled node 7 to 5 and 6 respectively. The benefit with the cashing is that the latency of accessing popular content will be reduced as it is now served from the cache of the operator controlled node.

A system that can be used to put the invention into practice is schematically shown in the FIG. 2 and FIG. 4. Enumerated items are shown in the figures as individual elements. In actual implementations of the invention, however, they may be inseparable components of other electronic devices such as a digital computer. Thus, actions described above may be implemented in software that may be embodied in an article of manufacture that includes a program storage medium. The program storage medium includes data signals embodied in one or more of a carrier wave, a computer disk (magnetic, or optical (e.g., CD or DVD, or both), non-volatile memory, tape, a system memory, and a computer hard drive.

The systems and methods of the present invention may be implemented for example on any of the Third Generation Partnership Project (3GPP), European Telecommunications Standards Institute (ETSI), American National Standards Institute (ANSI) or other standard telecommunication network architecture. Other examples are the Institute of Electrical and Electronics Engineers (IEEE) or The Internet Engineering Task Force (IETF).

The description, for purposes of explanation and not limitation, sets forth specific details, such as particular components, electronic circuitry, techniques, etc., in order to provide an understanding of the present invention. But it will be apparent to one skilled in the art that the present invention may be practiced in other embodiments that depart from these specific details. In other instances, detailed descriptions of well-known methods, devices, and techniques, etc., are omitted so as not to obscure the description with unnecessary detail. Individual function blocks are shown in one or more figures. Those skilled in the art will appreciate that functions may be implemented using discrete components or multi-function hardware. Processing functions may be implemented using a programmed microprocessor or general-purpose computer. The invention is not limited to the above described and in the drawings shown embodiments but can be modified within the scope of the enclosed claims.

The invention claimed is:

1. Method for arranging a distribution tree in a Peer To Peer (P2P) streaming system comprising a bootstrapping server that creates an external distribution tree based on received register messages from participating operator external clients, the method comprising the following steps:

configuring an operator controlled node that is part of a core network, to be a regular node in the created external distribution tree created by the bootstrapping server which is outside of and networked to the core network; and configuring the operator controlled node to be a parent node for participating operator internal clients, wherein configuring the operator that is part of the core network controlled node to be a parent node comprises:

capturing register messages from the participating internal clients at the operator controlled node that is part of the core network, wherein the register messages are addressed to the bootstrapping server which is outside of the core network, and replying to the internal clients with a reply that imitates a reply from the bootstrapping server which is outside of and networked to the core network, wherein the reply indicates the operator controlled node as parent node for the internal clients.

2. Method for arranging a distribution tree in a Peer To Peer streaming system according to claim 1, further comprising the following further steps:

preventing the captured register messages that are addressed to the bootstrapping server and that are captured at the operator controlled node from reaching the bootstrapping server.

3. Method for arranging a distribution tree in a Peer To Peer streaming system according to claim 2, wherein the configuring of the operator controlled node to be a node in the external tree comprises the following further steps:

sending a request for a parent node, from the operator controlled node to the bootstrapping server;

receiving node suggestions amongst nodes in the created external distribution tree, sent from the bootstrapping server at the operator controlled node; and selecting at least one node of the suggested nodes as parent node(s) for the operator controlled node.

4. Method for arranging a distribution tree in a Peer To Peer streaming system according to claim 1, further comprising the following steps:

receiving a request for content chunk from an internal client at the operator controlled node;

modifying the received request in the operator controlled node to simulate that the operator controlled node is requesting the content chunk; and sending the modified request from the operator controlled node to an external client.

5. Method for arranging a distribution tree in a Peer To Peer streaming system according to claim 4, further comprising the following steps:

receiving the requested content chunk from the external client at the operator controlled node; and forwarding the received content chunk from the operator controlled node to the internal client.

6. Method for arranging a distribution tree in a Peer To Peer P2P streaming system according to claim 5, further comprising the following steps:

storing the received content chunk.

7. Method for arranging a distribution tree in a Peer To Peer P2P streaming system according to claim 6, further comprising the following steps:

receiving from a second internal client at the operator controlled node, a request for the content chunk; and delivering the stored content chunk to the second internal client.

8. Method for arranging a distribution tree in a Peer To Peer P2P streaming system according to claim 1, further comprising performing the steps on at least one of tree-based and hybrid-based P2P systems.

9. Method for arranging a distribution tree in a Peer To Peer P2P streaming system according to claim 1, further comprising performing connectivity between the internal clients using tunneling.

10. An operator controlled node, that is part of a core network, for arranging a distribution tree in a Peer To Peer P2P streaming system, wherein the operator controlled node comprises:

electronics that configure the operator controlled node that is part of the core network to be a regular node in an operator external distribution tree created by a bootstrapping server which is outside of and networked to the core network;

electronics that configure the operator controlled node to be a parent node for participating operator internal clients;

electronics that capture register messages from the participating internal clients, wherein the register messages are addressed to the bootstrapping server which is outside of the core network;

electronics that are configured to reply to the internal clients with a reply that imitates a reply from the bootstrapping server which is outside of and networked to the core network, wherein the reply indicates the operator controlled node that is part of the core network as parent node for the internal clients.

11. An operator controlled node for arranging a distribution tree in a Peer To Peer P2P streaming system according to claim 10, which node further comprises:

electronics that perform deep packet inspection for identification of received messages sent by operator internal clients.

12. An operator controlled node for arranging a distribution tree in a Peer To Peer P2P streaming system according to claim 10, which node further comprises:

electronics that configure the node to function in two modes, regular peer mode and parent mode.

13. An operator controlled node that arrange a distribution tree in a Peer To Peer (P2P) streaming system according to claim 10, which node further comprises:

electronics that cache received streamed content.

14. An operator controlled node for arranging a distribution tree in a Peer To Peer P2P streaming system according to claim 10, which node further comprises:

electronics that re-create received messages.

15. An arrangement for arranging a distribution tree in a Peer To Peer (P2P) streaming system comprising a bootstrapping server that creates an external distribution tree based on received register messages from participating operator external clients, which arrangement comprises:

electronics that configure an operator controlled node that is part of a core network to be a regular node in the created external distribution tree created by the bootstrapping server which is outside of and networked to the core network;

electronics that configure the operator controlled node-to be a parent node for participating operator internal clients;

electronics that capture register messages from the participating internal clients by the operator controlled node, wherein the register messages are addressed to the bootstrapping server which is outside of and networked to the core network;

electronics that reply to the internal clients with a reply that imitates a reply from the bootstrapping server which is outside of the core network, wherein the reply indicates the operator controlled node as parent node for the internal clients.

16. An arrangement for arranging a distribution tree in a Peer To Peer streaming system according to claim 15, which arrangement further comprises:

electronics that prevent the captured register messages that are addressed to the bootstrapping server from reaching the bootstrapping server.

17. An arrangement for arranging a distribution tree in a Peer To Peer streaming system according to claim 16, which arrangement further comprises:
    electronics that send a request for a parent node, from the operator controlled node to the bootstrapping server;
    electronics that receive node suggestions amongst nodes in the created external distribution tree, from the bootstrapping server to the operator controlled node;
    electronics that select at least one node of the suggested nodes as parent node(s) for the operator controlled node.

18. An arrangement for arranging a distribution tree in a Peer To Peer streaming system according to claim 15, which arrangement further comprises:
    electronics that receive a request for content chunk from an internal client to at the operator controlled node;
    electronics that modify the received request in the operator controlled node to simulate that the operator controlled node is requesting the content chunk; and
    electronics that send the modified request from the operator controlled node to an external client.

19. An arrangement for arranging a distribution tree in a Peer To Peer streaming system according to claim 18, which arrangement further comprises:
    electronics that receive the requested content chunk from the external client at the operator controlled node; and
    electronics that forward the received content chunk from the operator controlled node to the internal client.

20. An arrangement for arranging a distribution tree in a Peer To Peer P2P streaming system according to claim 19, which arrangement further comprises:
    electronics configured to store the received content chunk.

21. An arrangement for arranging a distribution tree in a Peer To Peer (P2P) streaming system according to claim 20, which arrangement further comprises:
    electronics configured to receive from a second internal client at the operator controlled node, a request for the content chunk; and
    electronics configured to deliver the stored content chunk to the second internal client.

22. Article of manufacturing comprising a non-transitory program storage medium having a computer readable code embodied therein for arranging a distribution tree in a Peer To Peer P2P streaming system, which computer readable program code comprises:
    computer readable program code to configure an operator controlled node that is part of a core network to be a regular node in a created external distribution tree created by a bootstrapping server which is outside of and networked to the core network;
    computer readable program code to configure the operator controlled node to be a parent node for participating operator internal clients;
    computer readable program code configured to capture register messages from the participating internal clients by the operator controlled node, wherein the register messages are addressed to the bootstrapping server which is outside of the core network;
    computer readable program code configured to reply to the internal clients with a reply that imitates a reply from the bootstrapping server which is outside of and networked to the core network, wherein the reply indicates the operator controlled node as parent node for the internal clients.

23. The method for arranging a distribution tree in a Peer To Peer streaming system according to claim 1, wherein the distribution tree controls Peer To Peer communication in a network.

24. The operator controlled node for arranging a distribution tree in a Peer To Peer P2P streaming system according to claim 10, wherein the distribution tree controls Peer To Peer communication in a network.

25. The arrangement for arranging a distribution tree in a Peer To Peer streaming system according to claim 15, wherein the distribution tree controls Peer To Peer communication in a network.

26. The article of manufacturing according to claim 22, wherein the distribution tree controls Peer To Peer communication in a network.

* * * * *

UNITED STATES PATENT AND TRADEMARK OFFICE
CERTIFICATE OF CORRECTION

PATENT NO. : 9,049,206 B2  
APPLICATION NO. : 13/259502  
DATED : June 2, 2015  
INVENTOR(S) : Damola et al.

Page 1 of 1

It is certified that error appears in the above-identified patent and that said Letters Patent is hereby corrected as shown below:

In the specification

In Column 8, Line 11, delete "57-3" and insert -- S7-3 --, therefor.

In the claims

In Column 8, Line 54, in Claim 1, delete "Method" and insert -- A method --, therefor.

In Column 9, Line 11, in Claim 2, delete "Method" and insert -- The method --, therefor.

In Column 9, Line 19, in Claim 3, delete "Method" and insert -- The method --, therefor.

In Column 9, Line 30, in Claim 4, delete "Method" and insert -- The method --, therefor.

In Column 9, Line 41, in Claim 5, delete "Method" and insert -- The method --, therefor.

In Column 9, Line 48, in Claim 6, delete "Method" and insert -- The method --, therefor.

In Column 9, Line 53, in Claim 7, delete "Method" and insert -- The method --, therefor.

In Column 9, Line 60, in Claim 8, delete "Method" and insert -- The method --, therefor.

In Column 9, Line 64, in Claim 9, delete "Method" and insert -- The method --, therefor.

In Column 11, Line 18, in Claim 18, delete "to at the" and insert -- at the --, therefor.

Signed and Sealed this  
Twenty-fourth Day of November, 2015

Michelle K. Lee  
*Director of the United States Patent and Trademark Office*